United States Patent [19]
Provol et al.

[11] Patent Number: 5,309,707
[45] Date of Patent: May 10, 1994

[54] CONTROL METHODS AND VALVE ARRANGEMENT FOR START-UP AND SHUTDOWN OF PRESSURIZED COMBUSTION AND GASIFICATION SYSTEMS INTEGRATED WITH A GAS TURBINE

[75] Inventors: Steve J. Provol, Carlsbad; David B. Russell, San Diego, both of Calif.; Matti J. Isaksson, Karhula, Finland

[73] Assignee: Pyropower Corporation, San Diego, Calif.

[21] Appl. No.: 30,701

[22] Filed: Mar. 12, 1993

[51] Int. Cl.⁵ .............................. F02C 3/26; F02C 9/18
[52] U.S. Cl. ................................ 60/39.03; 60/39.25; 60/39.464
[58] Field of Search ............... 60/39.02, 39.03, 39.25, 60/39.464, 39.091

[56] References Cited

U.S. PATENT DOCUMENTS

| | | | |
|---|---|---|---|
| 4,498,285 | 2/1985 | Kreij | 60/39.1 |
| 4,498,286 | 2/1985 | Brannstrom et al. | 60/39.1 |
| 4,744,212 | 5/1988 | Andersson et al. | 60/39.02 |
| 4,860,535 | 8/1989 | Mansson et al. | 60/39.464 |
| 4,944,148 | 7/1990 | Hjalmarsson | 60/39.464 |

FOREIGN PATENT DOCUMENTS

| | | |
|---|---|---|
| 0234265 | 1/1987 | European Pat. Off. |
| 0294550 | 4/1988 | European Pat. Off. |
| 0318884 | 11/1988 | European Pat. Off. |

Primary Examiner—Louis J. Casaregola
Attorney, Agent, or Firm—Baker, Maxham, Jester & Meador

[57] ABSTRACT

A power plant having a system for converting coal to power in a gas turbine comprises a coal fed pressurized circulating bed for converting coal to pressurized gases, a gas turbine having a compressor for pressurizing air for the pressurized circulating bed and expander for receiving and expanding hot combustion gases for powering a generator, a first fast acting valve for controlling the pressurized air, a second fast acting valve means for controlling pressurized gas from the compressor to the expander.

15 Claims, 2 Drawing Sheets

CONTROL METHODS AND VALVE ARRANGEMENT FOR START-UP AND SHUTDOWN OF PRESSURIZED COMBUSTION AND GASIFICATION SYSTEMS INTEGRATED WITH A GAS TURBINE

BACKGROUND OF THE INVENTION

The present invention relates to coal fed power plants, and pertains particularly to an improved control system for a power plant having pressurized combustion or gasification of coal for powering a gas turbine to generate electric power.

There always exists in the power generating industry a need for more efficient power plants for converting fossil fuels to electrical power. The most efficient commercially available technology for power generation systems is the combined cycle gas/steam turbine operating on premium fuels. However, the cost and uncertainty the availability of premium fuels make premium fuel combined cycle power generating plants impractical. Therefore, there exists an even greater need for power plants capable of efficiently handling lower grades of fuels, particularly solid fuels, such as coal, that exist in abundance in many regions of the world for powering gas turbines.

Gas turbines can be operated from either pressurized combustion or gasification of coal or a combination of the the two. Thus, the pressurized combustion or gasification of coal allows the integration of a gas turbine for generating electrical power. One major problem of these systems is the safe shutdown of the turbine in case of malfunction of the turbine, such as a loss of load or balance of the turbine.

The prior art approach is to use a fast acting valve to shutoff or partially shutoff the flow of hot gases or fuel to the turbine, similar to shutdown systems used in natural gas fired combined cycle plants. The purpose of this fast acting valve is to allow rapid shutoff of the gas flow from the pressurized gasifier and/or combustor (PG/C) to the expander inlet in the event of loss of load on the gas turbine's generator or other malfunction. A major problem with this approach is that a complex and costly fast acting, high temperature valve must be used to allow an emergency shutdown of the system. The valve must operate under very high temperature, must close very quickly (on the order of less than 0.3–1.0 seconds), and must be very effective and reliable. In order for the valve to be effectively rapid or fast acting, a butterfly valve is typically used. This valve technology is generally considered to have a high degree of risk. Such fast acting butterfly valves cannot typically provide a tight seal, so some of the gas will leak through the valve when it is closed. This can pose two problems:

1. If too much hot gas leaks through the valve during a shutdown, the gas turbine may continue to accelerate, resulting in damage to the turbine and a potential safety hazard.
2. During a start-up of the plant, the first step is to start-up the gas turbine, firing oil or natural gas in a start-up burner. This occurs before any of the components in the PG/C have been exposed to hot gases. If the subject valve does not provide a tight seal, hot gases from the gas turbine's start-up burner can leak back into the PG/C and could cause damage to components that have not been preheated.

Thus, the start-up and shutdown of such an integrated coal fired combined cycle facility could be greatly simplified by having a valve arrangement and an approach which uses a valve which provides a tight seal, but is not required to be fast acting.

An example of the traditional prior art approach to the problem of shutdown is disclosed in U.S. Pat. No. 4,744,212 wherein the turbine is shutdown first by valves in the hot gas conduit between the bed vessel of the plant and the turbine. This patent also points up the problem of hot gas flow to the turbine being leakage flow through the valve in the hot gas conduit.

Another example of the prior art is disclosed in Kreij U.S. Pat. No. 4,498,285 and Brannstrom et al U.S. Pat. No. 4,498,286, which are companion cases issued Feb. 12, 1985. The Kreij patent is directed primarily to a special valving arrangement of a blow off valve for rapidly releasing the pressure in the combustion chamber when there is a sudden load drop on the turbine.

The Brannstrom et al patent discloses a valve arrangement and method for short-circuiting the fluidized bed so that it collapses. This stops the combustion in the fluidized bed. The problem of hot gas to the turbine is also pointed out by Brannstrom et al in their patent at column 2, lines 26–33.

The problem is achieving a rapid and complete shutdown of the turbine to prevent over speed in the case of loss of load or other problems. In the case of a loss of load, a turbine can accelerate to dangerous over speed conditions in about 0.3–2.0 seconds. Also, a partial leakage of hot gases to the turbine in the case of a loss of load on the turbine can result in the turbine continuing to accelerate to dangerous speed levels. Thus, an effective shutoff or interruption of the hot gas to the turbine must be achieved rapidly.

Accordingly, an improved power plant to overcome these problems of the prior art would be desirable.

SUMMARY AND OBJECTS OF THE INVENTION

It is the primary object of the present invention to provide an improved coal fed power plant having effective control means for powering a gas turbine.

In accordance with a primary aspect of the present invention, a pressurized coal fired power plant includes fast acting valve means for rapidly shutting off compressed air from the compressor to the combustor and rapidly directing it to the inlet of the expander for rapid emergency shutdown of the gas turbine.

BRIEF DESCRIPTION OF THE DRAWING

The above and other objects of the present invention will become apparent from the following description when read in conjunction with the drawings wherein.

DETAILED DESCRIPTION OF A PREFERRED EMBODIMENT

Figure 1:
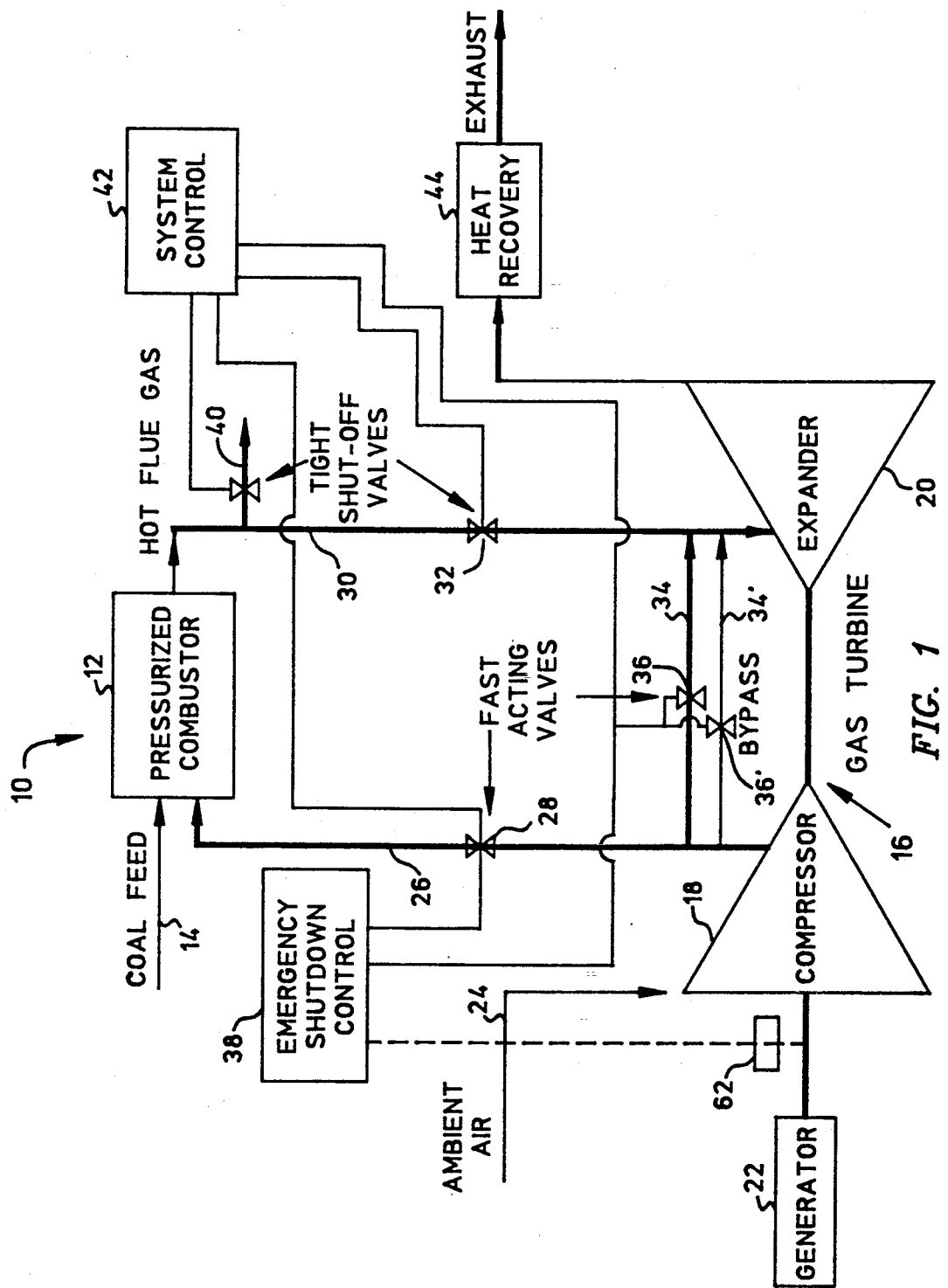
FIG. 1 is a schematic illustration of a coal fed power plant having a pressurized combustor and including an exemplary embodiment of the invention.

Referring to FIG. 1 of the drawings, there is schematically illustrated a power plant system having means for converting coal to power in a gas turbine, designated generally by the numeral 10. The system includes a pressurized combustor 12 into which coal is fed from a source at 14. The combustor can be either a bubbling fluidized bed combustor or a circulating fluidized bed combustor.

A turbine, designated generally by the numeral 16, includes a compressor 18 and an expander 20 powering a generator 22. Ambient air is drawn into the compressor at 24 and following compression is fed by way of a high pressure conduit 26 having a fast acting valve 28 to the pressurized combustor 12. The hot combustion gases from the combustor 12 are then filtered and passed along a high pressure conduit system 30 by way of a tight shutoff valve 32 to the expander 20. A bypass conduit 34 with a fast acting valve 36 connects between the outlet of the compressor and conduit 24 and the inlet to the expander.

The term "fast shutoff valve" as used herein means a valve having a reasonably tight seal, and capable of full open to full closed positions in 0.2 to 1.0 seconds. These are typically butterfly valves by current technology. The term "tight shutoff valve" means a valve with a tight seal for one-hundred percent shutoff of gas flow and capable of full opened to full closed positions in from 2 to 10 seconds. These are typically gate valves and are designed for high temperature operation from around 1200 degrees to about 1800 degrees Fahrenheit.

The present system is designed for a novel approach to shutdown of the turbine in case of loss of load, loss of balance or other problems with the system. To this end, special valves are located in special positions within the system, with an emergency shutdown control system 38 for operating the fast acting valves. This special valve arrangement and operating procedure function to rapidly divert combustor air from the pressurized gasifier or combustor (PG/C) to the inlet of the expander or turbine. In the illustrated embodiment (FIG. 1), valves 28 and 36 are fast acting valves with modulating control capability of from zero to one-hundred percent air flow, with a tight seal and capability of full opened to full closed position in 0.2 to 1.0 seconds. These valves are preferably hydraulically actuated for fast response by the emergency shutdown control system and will be substantially simultaneously actuated. The valves are designed for capability of operation up to 1000 degrees Fahrenheit and are typically butterfly type valves, although other valves with these capabilities may be acceptable.

The valve 32 for controlling the hot gases from the pressurized combustor is a tight shutoff valve. This valve is not required to modulate and will operate either fully open, passing 100% of the gas flow or fully closed, isolating the turbine from the fluidized bed. It may be hydraulically actuated with a tight seal capable of full closed to full opened or full opened to full closed in from two to ten seconds. Longer opening and/or closing times may be acceptable. This valve is preferably designed for a capability of operating at temperatures in the range of 1500 to 1800 degrees Fahrenheit. This valve is preferably a gate type valve, although other types of valves with these capabilities will be acceptable.

A vent valve 40 is provided in conduit 30 for venting the hot gases from the pressurized combustion chamber. This valve is an on/off valve allowing zero or one-hundred percent hot gas flow, and may be hydraulically actuated with a tight seal and capable of full closed to full opened or full opened to full closed in from two to ten seconds. Longer opening and closing times may be acceptable in certain operations. The valve must have a capability of effective and reliable operation at temperatures in the range of 1500 to 1800 degrees Fahrenheit. This is preferably a gate type valve but other types of valves with the aforementioned capability will be acceptable.

This valve arrangement, as above described, eliminates the need for fast acting high temperature valves in the hot gas conduit between the combustor and expander where valve 32 is located. The reason that the fast acting valve (at 32) can be eliminated is that valve 36 can be designed so that the pressure drop across it is lower than the pressure drop across the combustor (12) and related components. Thus, when valve 36 opens and valve 28 closes, the pressure of the gases bypassing the combustor through bypass 36 will be higher than the pressure of the gases in the conduit or passage via valve 32. The bypassed flow of cooler high pressure air from the compressor will preferentially flow to the expander because of its higher pressure. The bypassed air should be released as close as possible to the turbine to minimize the amount of residual hot gases that pass through the turbine in advance of the cooler bypassed air. A redundant valve 36 as illustrated in FIG. 1 can also be employed to enhance reliability.

These cooler gases do not have sufficient thermal energy to allow the turbine to maintain speed or accelerate, so it will coast down to a slower speed. Valve 32 can now be closed at a much slower rate, if desired to seal the hot gases in the combustor for a restart, or can be left open, If left open, the hot gases in the combustor will slowly be mixed with the bypassed air in increasing amounts, and the turbine will continue to decelerate. Thus, valve 32 is not a critical component in an emergency shutdown where a malfunction of the gas turbine or generator occurs. This also improves the capability of providing a tight shutoff of the valve in this location, namely valve 32, thereby also improving conditions during start-up.

Figure 2:
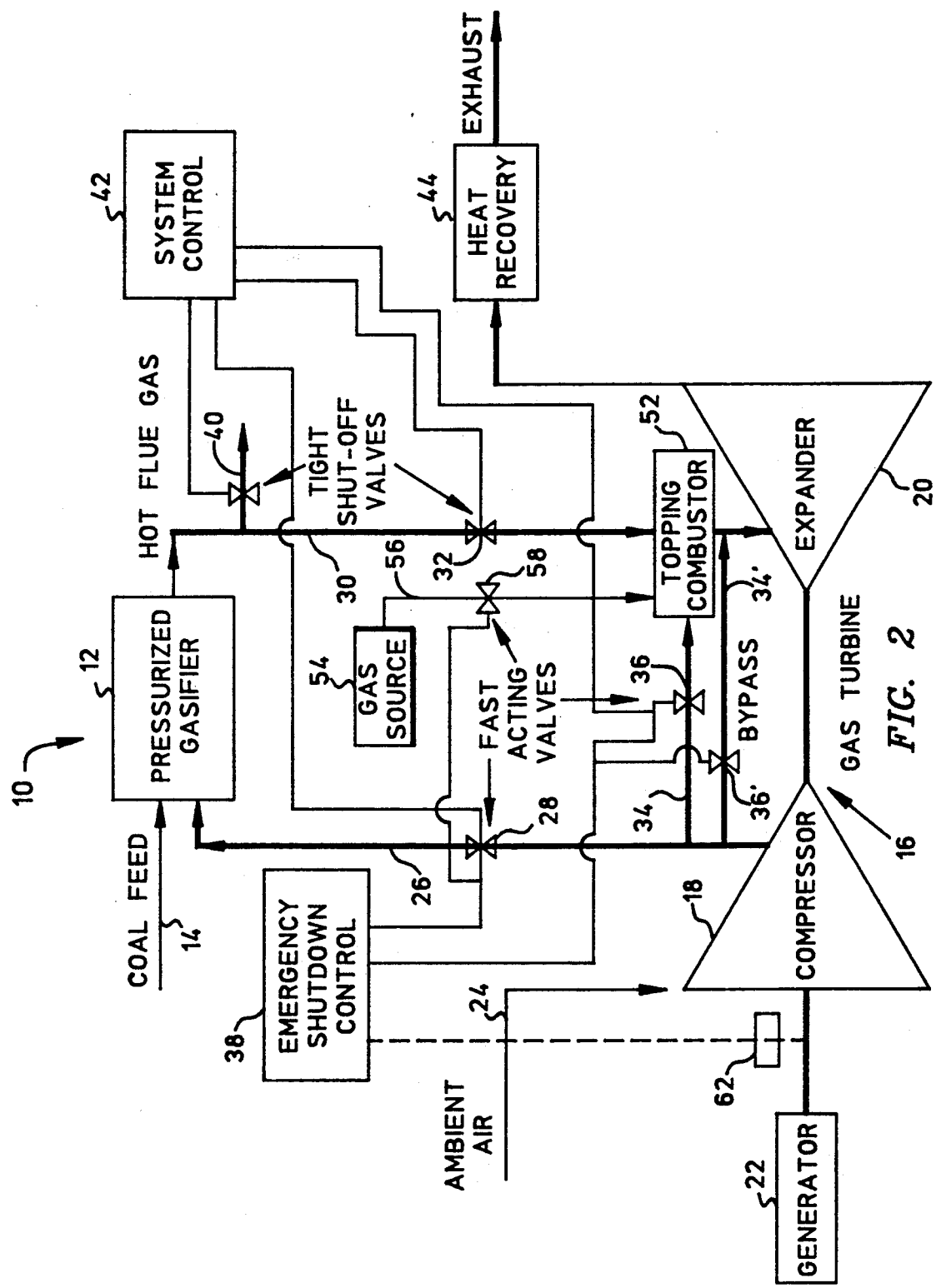
FIG. 2 is a schematic illustration of an alternate coal fed power plant having a pressurized gasifier and incorporating an exemplary embodiment of the invention.

Referring to FIG. 2 of the drawings, an alternate embodiment or modification to the system is illustrated, designated generally at 46. The principles of the present invention are applicable to many different systems and combinations thereof. For example, the present invention may be applied to a pressurized gasification system, a combination pressurized combustor and gasification system and pressurized combustor systems wherein a topping combustor may be used. The topping combustor may be fueled by natural gas or by syn-gas. The illustrated system, wherein identical components will be referred to by the same reference numeral, differs from the prior power plant system in that it utilizes a topping combustor for further heating gases fed to the topping. In this embodiment, compressed combustor air is fed by high pressure conduit 26 to pressurized combustor 12, which operates in the usual manner to provide hot gases by way of a conduit 30 to a topping combustor 52 which further heats and supplies hot gases to the expander 20. The topping combustor is fueled by gas from source 54 via line 56 and fast acting valve 58. This valve 58 is also controllable by the emergency shutdown control. A tight shutoff valve 32 controls the flow of gases from the pressurized combustor 12 to the combustor 52. A second tight shutoff valve 40 functions to vent hot gases from between the pressurized combustor and the combustor.

A rapid bypass conduit 34 connects between the compressor and pressurized air conduit 26 and the combustor 52 for bypassing the pressurized combustor and is controlled by the fast acting valve 36. A redundant bypass 58' with fast acting valve 60' is provided directly to the inlet of the expander in case of failure of valve 36. The emergency shutdown control system 38 is connected to and capable of operating fast acting valves 28, 36 (and 60') and 58 for emergency shutdown control The emergency control is also preferably provided with suitable speed or load sensing units or means 62. It may also include other sensors for determining problem conditions in the system. The overall control system 42 is connected to operate each of the valves, and also preferably includes suitable sensing means for sensing various parameters of the power plant system.

The system (both FIG. 1 and FIG. 2 versions) is provided with novel shutdown valves and method which overcomes some of the major problems of the prior art. This emergency shutdown system comprises fast acting valves in the high pressure air conduits between the compressor and the pressurized combustor and in a bypass line between the compressor and the expander. These high speed valves in case of an emergency shutdown are rapidly operated by simultaneously opening valve 36 and closing valve 28 (in 0.2 to 2.0 seconds) to bypass compressed combustor air directly to the expander.

This results in an immediate halt in the flow of cold compressed air to the pressurized combustor and hot combustion gases from the pressurized combustor and fuel gas from the pressurized gasifier. It directly feeds cold air directly into the expander, thereby rapidly dropping temperature to the expander and reducing the velocity of the turbine. This is in contrast to the traditional approach which is to immediately and rapidly shutdown the flow of hot combustion gas from the combustor to the expander by means of a fast acting valve.

In operation for an emergency shutdown, simultaneously valve 36 is rapidly opened and valve 28 is rapidly closed (in 0.2 to 2.0 seconds). Since the pressure drop across the pressurized combustor unit is substantially greater than the design pressure loss across the valve 38, these valves can be opened to a preset level that results in the colder compressor outlet air to be quickly bypassed or diverted in a controlled fashion to the expander inlet. The compressor air pressure is immediately higher than the pressurized combustor or gasifier outlet. This cooler air rapidly reduces the turbine inlet temperature, resulting in a deceleration of the turbine. Once the turbine speed is stabilized, valve 36 can be modulated to allow bleeding of the hot gases from the pressurized combustor through the turbine in a controlled fashion. Alternatively, valve 32 can be closed and the pressurized combustor be depressurized through valve 40. For a gasifier, as in FIG. 2, the depressurized hot syn-gases can be flared or retained for start-up.

For a single shaft gas turbine, the compressor accounts for a significant load on the shaft. In a case of a loss of generator load, as the turbine initially accelerates beyond design speed, both the turbine and compressor will lose efficiency. This increases the relative resistance the compressor provides to acceleration. This will inhibit acceleration.

The start-up procedure is initiated and performed substantially the same as that of a standard natural gas fired turbine start-up sequence. The start-up procedure is the same for both the pressurized combustor and gasifier and will be described in relation to both (pressurized combustor/gasifier). The start-up begins with valves 28, 32 and 40 closed and valve 36 open. Valve 32 as a tight shutoff valve will prevent the passage of hot gases back into the unheated combustor system. Once the engine achieves synchronous speed, it is available to begin the step pressurized combustor or gasifier purge. Simultaneously with the gas turbine start-up, the pressurized combustor/gasifier will be charged with a start-up bed inventory.

The initial purge will be carried out with valve 28 modulating to maintain about thirty percent by volume of air flow through the pressurized combustor/gasifier. Valve 36 will be full opened with valve 32 closed, and valve 40 full opened to pass air flow through the pressurized combustor/gasifier without pressurizing. After the engine reaches one-hundred percent NGP speed and the generator is synchronized, the pressurized combustor/gasifier and filter will be purged.

The initial pressurized combustor/gasifier and filter purge is performed by modulating valve 28 open to obtain thirty percent of the volume air flow, and valve 40 is fully opened during this purge procedure. The purge is complete after five volumes of air of the pressurized combustor/gasifier, downstream piping and filter have been exchanged.

In carrying out the pressurized combustor/gasifier, pressurization cycle valve 28 will be modulated opened to flow compressor discharge air without over temperature of the turbine. This would be approximately twenty-five percent compressor total mass flow. Valve 36 is modulated closed to complete pressurized combustor/gasifier pressurization above turbine inlet pressure. Valve 32 remains fully closed and valve 40 is programmed closed after initial purge. Pressurization is accomplished by first closing valve 40 then modulating valve 28 open, which will allow engine compressor discharge air to fill and pressurize the pressurized combustor/gasifier. Compressor discharge air for pressurization will approach 700 degrees Fahrenheit and will also assist in the pressurized combustion/gasifier warm up cycle. The control of valve 28 will be scheduled to limit volumetric flow to avoid carry over of bed inventory to filter due to high velocity in the combustor, and limit total mass flow to the pressurized combustor/gasifier to maintain gas turbine synchronous speed and avoid gas turbine over temperature. The pressurization will be completed after satisfying pressure across valve 32 being slightly higher on the pressurized combustor/gasifier side, with the engine operating at one-hundred percent synchronous speed and no load conditions. Valve 28 is at this point completely opened with negligible flow.

Pressurized combustor/gasifier purge light off and warm up period will be carried out with valve 28 open and valve 36 (or 60) modulating to schedule proper flow to the pressurized combustor/gasifier. Valve 32 will be closed through purge, with valve 40 modulating to maintain pressure during the purge.

The pressurized combustor/gasifier purge at pressure is performed with valve 32 closed and valve 40 modulated to hold pressure while valve 36 is modulated to obtain thirty percent by volume air. As valve 40 opens, or valve 36 closes, the start-up combustor exit temperature must increase to maintain the one-hundred percent synchronous speed, no load engine operation. The start-up combustor exit temperature will be used to control the turbine inlet temperature during the purge. Upon completion of the purge, valve 32 will be programmed opened, then valve 40 will be programmed closed. Negligible flow across valve 32 will occur when the valve is opened due to equal pressure across the valve. Closing valve 40 will divert the flow from the combustor/gasifier to the turbine inlet. Valve 36 will modulate to maintain the minimum purge to the pressurized combustor/gasifier now discharging to the turbine inlet. It will also maximize the flow of air to the pressurized combustor/gasifier while maintaining the average turbine inlet temperature required to maintain one-hundred percent synchronous speed with stable engine operation.

With an initial minimum of compressor volume flow to the pressurized combustor/gasifier light off and fire on start-up fuel, the start-up combustor will be fired to maintain a constant minimum combustor exit temperature. Valve 36 will modulate to control the air flow split between the start-up burner and the pressurized combustor/gasifier to maximize the flow of air to the PCG (pressurized combustor/gasifier) while maintaining the average turbine inlet temperature required to maintain one-hundred percent synchronous speed. The warm up continues until the pressurized combustor/gasifier discharge temperature is greater than the desired minimum.

The plant is now transferred to pressurized combustor/gasifier firing only by fully closing valve 36. The firing of the pressurized combustor/gasifier is continued up to a maximum rating on start-up fuel based on available compressor air flow. Engine speed is maintained as demand is shifted to the pressurized combustor/gasifier from the start-up combustor, with the engine expected to have nominal load to maintain constant speed and stable operation. The valve 36 is programmed closed to transfer from start-up combustor to design fuel firing. The transfer is complete with the start-up combustor air and fuel flow stopped, valve 38 fully opened, valve 36 fully closed, valve 32 fully opened, and valve 40 fully closed. Coal fuel feed is then begun and increased to raise turbine inlet temperature and plant electrical output up to rated gas turbine inlet temperature.

A normal control shutdown of the system is initiated by the fuel firing in the pressurized combustor/gasifier decreased to a minimum. Due to the higher pressure across the pressurized combustor/gasifier relative to the bypass, valve 36 can be modulated open, allowing bypassing of colder compressor air to mix with the outer pressure combustor/gasifier exhaust at inlet of the gas turbine. This will lower the turbine inlet temperature, reducing the turbine load to one-hundred percent speed no load conditions. Fuel feed can then be stopped and valve 28 can be modulated closed as valve 36 is opened, allowing controlled deceleration of the turbine and the de-pressurization of the pressurized combustor/gasifier.

While we have illustrated and described our invention by means of specific embodiments, it is to be understood that numerous changes and modifications may be made therein without departing from the spirit and scope of the invention as defined in the appended claims.

We claim:

1. A power plant having a system for converting coat to power in a gas turbine, comprising:

coal fed pressurized means for converting coal to pressurized gases for powering a gas turbine;

a gas turbine having a compressor for pressurizing combustion air for said pressurized means and expander means for receiving and expanding hot combustion gases for powering a generator for generating electrical power;

control means including first fast acting valve means for controlling flow of pressurized air from said compressor to said pressurized means, and second fast acting valve means for controlling flow of pressurized air from said compressor to said expander means for rapidly diverting flow of pressurized combustion air around said pressurized means to said expander means for emergency shutdown of said turbine during emergency conditions, first tight shutoff valve means for isolating flow between said pressurized means and said expander; and second tight shutoff valve means for venting gases from said pressurized means, wherein said first fast acting valve means is a butterfly valve.

2. A power plant according to claim 1 wherein said first tight shutoff valve means is a gate valve.

3. A power plant according to claim 1 wherein said first fast acting valve means is a butterfly valve.

4. A power plant according to claim 1 wherein said second fast acting valve means is a butterfly valve.

5. A power plant according to claim 1 wherein first fast acting valve means and said second fast acting valve means are low temperature valves capable of operating up to 1000 degrees Fahrenheit.

6. A power plant according to claim 1 wherein said first tight shutoff valve is capable of operating within a temperature range of about 1500 to 1800 degrees Fahrenheit.

7. A power plant according to claim 6 wherein said second tight shutoff valve is capable of operating within a temperature range of about 1500 to 1800 degrees Fahrenheit.

8. A power plant according to claim 1 wherein said first and said second fast acting valves means are low temperature butterfly valves capable of operating at temperatures up to 1000 degrees Fahrenheit; and said first and said second tight shutoff valves means are high temperature gate valves capable of operating at temperatures of from about 1500 degrees up to about 1800 degrees Fahrenheit.

9. A power plant according to claim 1 wherein said control means is capable of operating said first and said second fast acting means between full open and full closed positions within a period of from 0.2 to 2.0 seconds.

10. A power plant for converting coal to power in a gas turbine, comprising:

coal fed pressurized means for converting coal to pressurized gases for powering a gas turbine;

a gas turbine having a compressor for pressurizing combustion air for said pressurized means and expander means for receiving and expanding hot combustion gases for powering a generator for generating electrical power;

a first conduit means for supplying pressurized air to said pressurized means;

first fast acting valve means in said first conduit means for controlling pressurized air therein;

second conduit means for supplying pressurized air to said expander means;

second fast acting valve means in said second conduit means for controlling pressurized air therein;

third conduit means for supplying pressurized gases to said expander means;

a first tight shutoff valve in said third conduit means for isolating pressurized gases to said expander during start-up and in preparation for restarting; and a second tight shutoff valve in said third conduit means for venting gases from said pressurized means.

11. A power plant according to claim 10 wherein said first fast acting valve and said second fast acting valve are each low temperature butterfly valves capable of operating at temperatures up to 1000 degrees Fahrenheit; and said first tight shutoff valve and said second tight shutoff valve are each high temperature gate valves capable of operating at temperatures of about 1200 degrees up to about 1800 degrees Fahrenheit.

12. A power plant according to claim 11 comprising emergency shutdown control means for operating said first fast acting valve and said second fast acting valve between full open and full closed positions within a period of from 0.2 to 2.0 seconds.

13. A power plant according to claim 12 wherein said pressurized means is a combustor.

14. A method of operating a power plant having a system for converting coal to power in a gas turbine, comprising:

providing coal fed pressurized combustor means for converting coal to pressurized gases for powering a gas turbine;

providing a gas turbine having a compressor for pressurizing combustion air for said pressurized combustor means and expander means for receiving and expanding hot combustion gases for powering a generator for generating electrical power;

providing first fast acting valve means for controlling flow of pressurized air from said compressor to said pressurized combustor means;

providing second fast acting valve means for controlling flow of pressurized air from said compressor to said expander means;

providing first tight shutoff valve means for isolating back flow of pressurized gases to said combustor during start-up and/or to said expander in preparation for hot restart;

providing a second tight shutoff valve means for venting gases from said pressurized combustor means; and providing emergency shut-down control means for operating said first fast acting valve and said second fast acting valve between full open and full closed positions within a period of from 0.2 to 2.0 seconds.

15. A power plant according to claim 14 wherein said step of providing said first fast acting valve and said second fast acting valve includes providing each to be low temperature butterfly valves capable of operating at temperatures up to 1000 degrees Fahrenheit; and said step of providing said first tight shutoff valve and said second tight shutoff valve includes providing each to be high temperature gate valves capable of operating at temperatures of from about 1500 degrees up to about 1800 degrees Fahrenheit.

* * * * *

UNITED STATES PATENT AND TRADEMARK OFFICE
CERTIFICATE OF CORRECTION

PATENT NO. : 5,309,707  
DATED : May 10, 1994  
INVENTOR(S) : Provol et al.

It is certified that error appears in the above-indentified patent and that said Letters Patent is hereby corrected as shown below:

On the title page item [57], line 5, before "expander" insert --an-- .

On the title page item [57], line 8, before "a second" insert --and-- .

Column 1, line 21, before "the availability" insert --of-- .

Column 1, line 30, before "two" delete "the".

Column 5, line 15, before "method" insert --a-- .

Column 7, line 62, delete "coat" and insert --coal-- .

Signed and Sealed this

Thirty-first Day of January, 1995

*Attest:*

BRUCE LEHMAN

*Attesting Officer*     *Commissioner of Patents and Trademarks*